US012549239B2

(12) United States Patent
Liu et al.

(10) Patent No.: US 12,549,239 B2
(45) Date of Patent: Feb. 10, 2026

(54) CAPABILITY FOR USING ANTENNA CONFIGURATION SET FOR UPLINK BEAM

(71) Applicant: QUALCOMM Incorporated, San Diego, CA (US)

(72) Inventors: Le Liu, San Jose, CA (US); Alberto Rico Alvarino, San Diego, CA (US); Peter Gaal, San Diego, CA (US); Chiranjib Saha, San Diego, CA (US); Xiao Feng Wang, San Diego, CA (US); Wanshi Chen, San Diego, CA (US); Umesh Phuyal, San Diego, CA (US); Kazuki Takeda, Minato-ku (JP); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 18/341,624

(22) Filed: Jun. 26, 2023

(65) Prior Publication Data
US 2024/0113761 A1 Apr. 4, 2024

Related U.S. Application Data

(60) Provisional application No. 63/377,849, filed on Sep. 30, 2022.

(51) Int. Cl.
*H04B 7/06* (2006.01)
*H04L 5/00* (2006.01)
*H04W 72/231* (2023.01)

(52) U.S. Cl.
CPC ......... *H04B 7/0695* (2013.01); *H04B 7/0628* (2013.01); *H04L 5/0048* (2013.01); *H04W 72/231* (2023.01)

(58) Field of Classification Search
CPC ... H04B 7/0695; H04B 7/0628; H04L 5/0048; H04L 5/0053; H04L 5/0094; H04W 72/231
See application file for complete search history.

(56) References Cited

U.S. PATENT DOCUMENTS

| | | | |
|---|---|---|---|
| 2019/0182898 A1* | 6/2019 | Yu | H04B 7/06958 |
| 2020/0029274 A1* | 1/2020 | Cheng | H04B 17/309 |
| 2022/0303973 A1* | 9/2022 | Sun | H04W 72/51 |
| 2023/0155657 A1* | 5/2023 | Zhang | H04W 52/365 |
| | | | 455/101 |

FOREIGN PATENT DOCUMENTS

WO WO-2021155719 A1 8/2021

OTHER PUBLICATIONS

International Search Report and Written Opinion—PCT/US2023/073761—ISA/EPO—Dec. 20, 2023.

* cited by examiner

*Primary Examiner* — Afshawn M Towfighi
(74) *Attorney, Agent, or Firm* — QUALCOMM Incorporated

(57) ABSTRACT

Various aspects of the present disclosure generally relate to wireless communication. In some aspects, a user equipment (UE) may transmit an indication of a UE capability for using one or more transmit antenna configuration sets for uplink beams. The UE may receive a radio resource control configuration associated with uplink transmission with an uplink beam. Numerous other aspects are described.

30 Claims, 10 Drawing Sheets

CAPABILITY FOR USING ANTENNA CONFIGURATION SET FOR UPLINK BEAM

CROSS-REFERENCE TO RELATED APPLICATION

This patent application claims priority to U.S. Provisional Patent Application No. 63/377,849, filed on Sep. 30, 2022, entitled "CAPABILITY FOR USING ANTENNA CONFIGURATION SET FOR UPLINK BEAM," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating a capability for using an antenna configuration set for an uplink beam.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication of a UE capability for using one or more transmit antenna configuration sets (ACSs) for uplink beams. The method may include receiving a radio resource control (RRC) configuration associated with uplink transmission with an uplink beam.

Some aspects described herein relate to a method of wireless communication performed by a network node. The method may include receiving an indication of a UE capability of a UE of an unmanned aerial vehicle for using transmit ACSs for uplink beams. The method may include transmitting an RRC configuration associated with uplink transmission with an uplink beam from the UE.

Some aspects described herein relate to an apparatus of a UE for wireless communication. The apparatus may include one or more memories and one or more processors coupled to the one or more memories. The one or more processors may be individually or collectively configured to cause the UE to transmit an indication of a UE capability for using one or more transmit ACSs for uplink beams. The one or more processors may be individually or collectively configured to cause the UE to receive an RRC configuration associated with uplink transmission with an uplink beam.

Some aspects described herein relate to an apparatus of a network node for wireless communication. The apparatus may include one or more memories and one or more processors coupled to the one or more memories. The one or more processors may be individually or collectively configured to cause the network node to receive an indication of a UE capability of a UE of an unmanned aerial vehicle for using transmit ACSs for uplink beams. The one or more processors may be individually or collectively configured to cause the network node to transmit an RRC configuration associated with uplink transmission with an uplink beam from the UE.

Some aspects described herein relate to a non-transitory computer-readable medium that stores a set of instructions for wireless communication by a UE. The set of instructions, when executed by one or more processors of the UE, may cause the UE to transmit an indication of a UE capability for using one or more transmit ACSs for uplink beams. The set of instructions, when executed by one or more processors of the UE, may cause the UE to receive an RRC configuration associated with uplink transmission with an uplink beam.

Some aspects described herein relate to a non-transitory computer-readable medium that stores a set of instructions for wireless communication by a network node. The set of instructions, when executed by one or more processors of the network node, may cause the network node to receive an indication of a UE capability of a UE of an unmanned aerial vehicle for using transmit ACSs for uplink beams. The set of instructions, when executed by one or more processors of the network node, may cause the network node to transmit an RRC configuration associated with uplink transmission with an uplink beam from the UE.

Some aspects described herein relate to an apparatus for wireless communication. The apparatus may include means for transmitting an indication of a capability for using one or more transmit ACSs for uplink beams. The apparatus may include means for receiving an RRC configuration associated with uplink transmission with an uplink beam.

Some aspects described herein relate to an apparatus for wireless communication. The apparatus may include means for receiving an indication of a capability of another apparatus of an unmanned aerial vehicle for using transmit ACSs for uplink beams. The apparatus may include means for transmitting an RRC configuration associated with uplink transmission with an uplink beam from the other apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
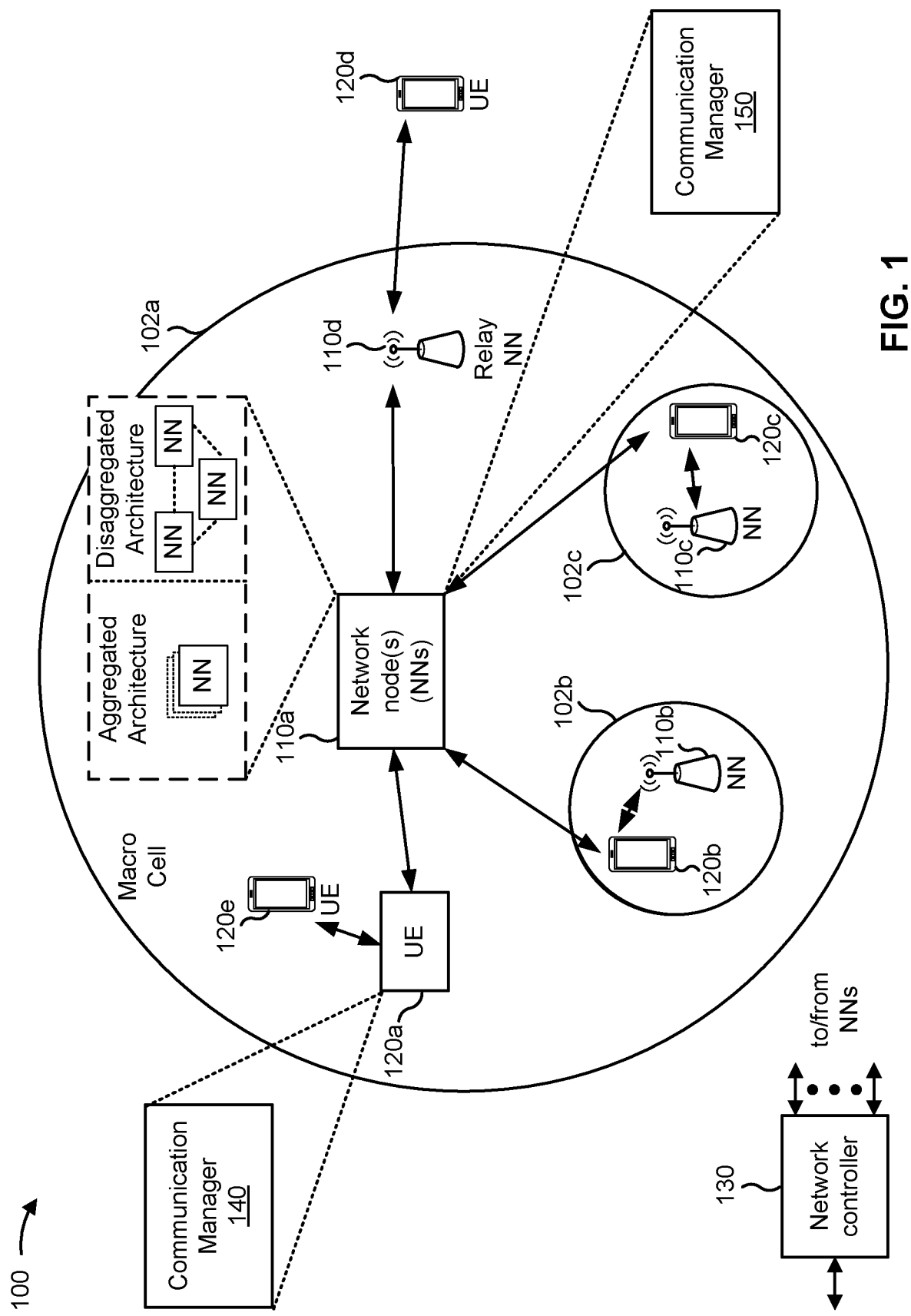
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may transmit an indication of a UE capability for using one or more transmit antenna configuration sets (ACSs) for uplink beams. The communication manager 140 may receive a radio resource control (RRC) configuration associated with uplink transmission with an uplink beam. Additionally, or alternatively, the communication manager 140 may perform one or more other operations described herein.

In some aspects, a network entity (e.g., a network node 110) may include a communication manager 150. As described in more detail elsewhere herein, the communication manager 150 may receive an indication of a UE capability of a UE of an unmanned aerial vehicle for using transmit ACSs for uplink beams. The communication manager 150 may transmit an RRC configuration associated with uplink transmission with an uplink beam from the UE. Additionally, or alternatively, the communication manager 150 may perform one or more other operations described herein.

As indicated above, FIG. 1 is provided as an example. Other examples may differ from what is described with regard to FIG. 1.

Figure 2:
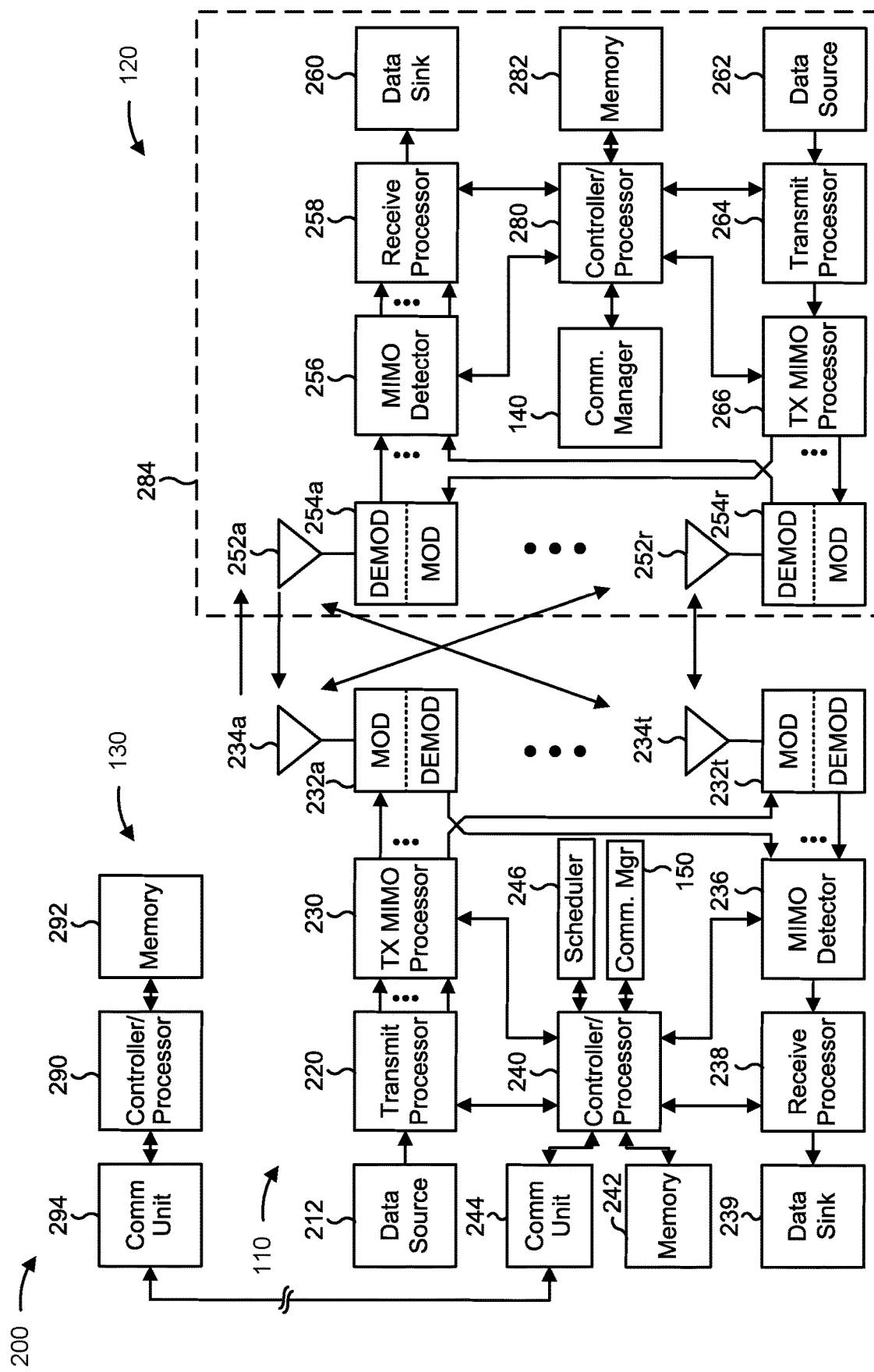
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

A controller/processor of a network entity (e.g., the controller/processor 240 of the network node 110), the controller/processor 280 of the UE 120, and/or any other component(s) of FIG. 2 may perform one or more techniques associated with a UE capability for using an antenna configuration set (ACS) for an uplink beam from an aerial UE (e.g., a UAV), as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., a UE 120) includes means for transmitting an indication of a UE capability for using one or more transmit ACSs for uplink beams; and/or means for receiving an RRC configuration associated with uplink transmission with an uplink beam. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a network node 110) includes means for receiving an indication of a UE capability of a UE of an unmanned aerial vehicle for using transmit ACSs for uplink beams; and/or means for transmitting an RRC configuration associated with uplink transmission with an uplink beam from the UE. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more Rus, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more Rus. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
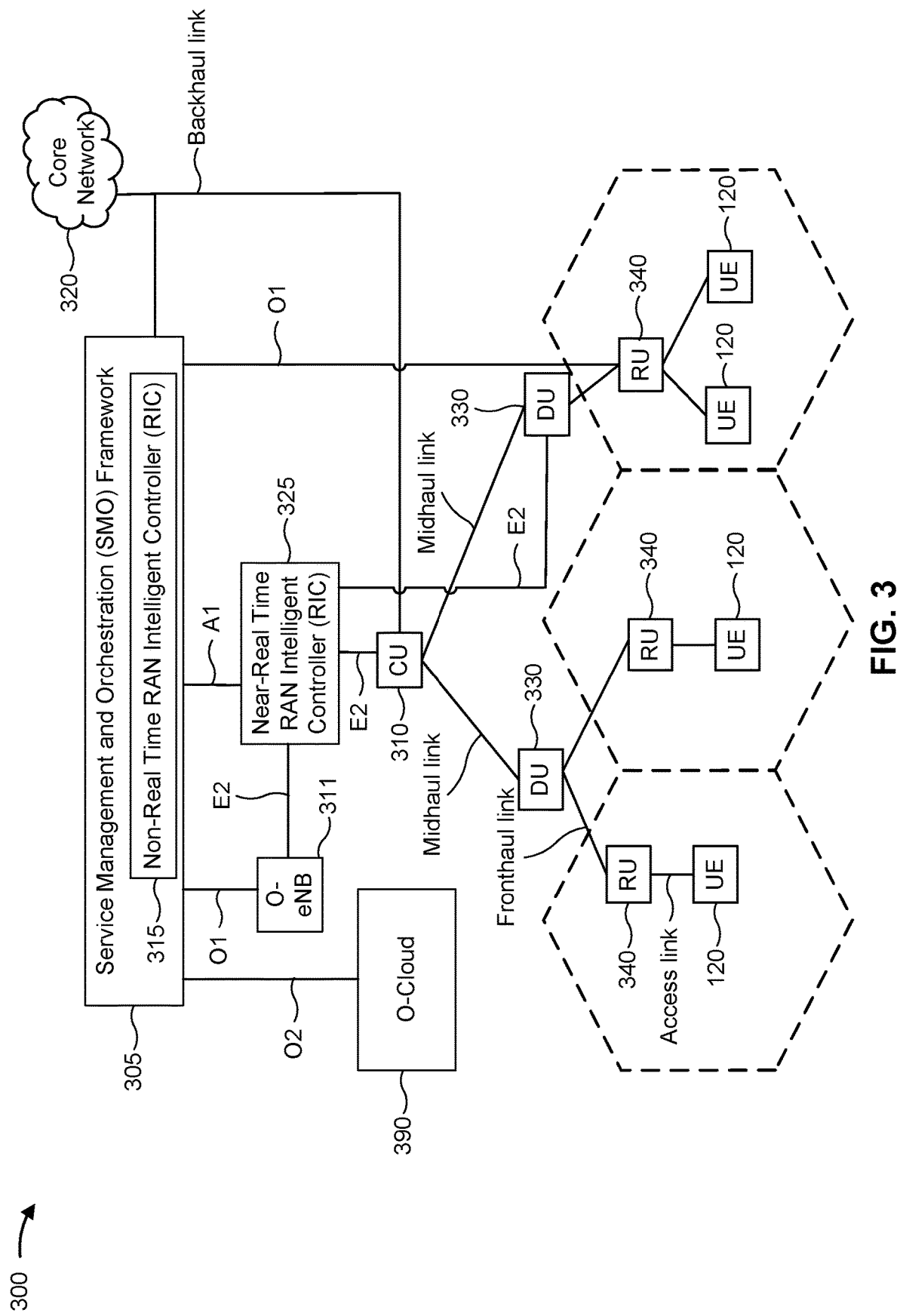
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
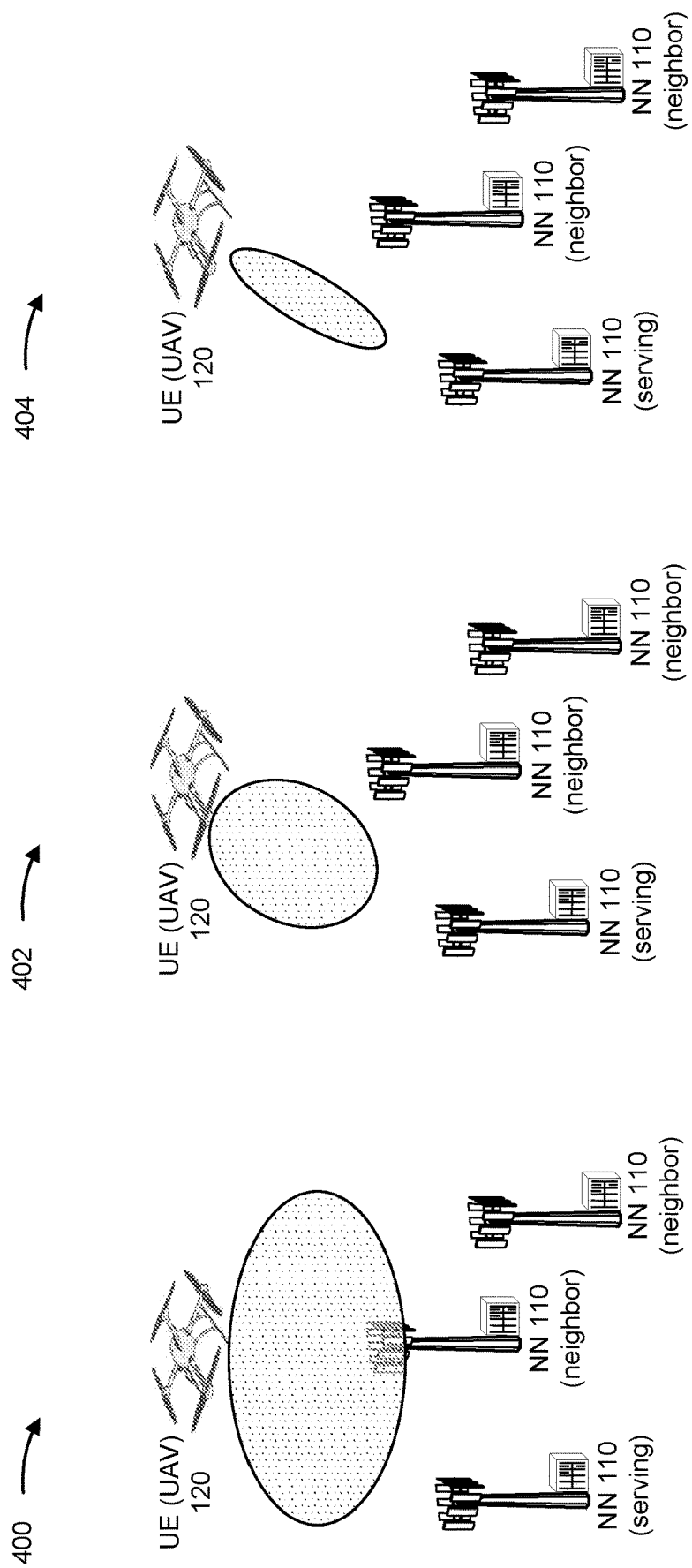
FIG. 4 is a diagram illustrating examples of uplink beams of an aerial UE, in accordance with the present disclosure.

FIG. 4 is a diagram illustrating examples 400, 402, and 404 of uplink beams of an aerial UE, in accordance with the present disclosure.

A UE (e.g., UE 120) may be an aerial UE, such as a UE at an unmanned aerial vehicle (UAV) shown as UE (UAV) 120 in FIG. 4. The UAV may be an aircraft without a human pilot aboard and can also be referred to as an unmanned aircraft (UA), a drone, a remotely piloted vehicle (RPV), a remotely piloted aircraft (RPA), or a remotely operated aircraft (ROA). The UAV may have a variety of shapes, sizes, configurations, characteristics, and/or the like for a variety of purposes and applications. In some aspects, the UAV may include one or more sensors, such as an electromagnetic spectrum sensor (e.g., a visual spectrum, infrared, or near infrared camera, a radar system, and/or the like), a biological sensor, a temperature sensor, a chemical sensor, and/or the like. In some aspects, the UE 120 may include one or more components for communicating with one or more network nodes 110. The UE 120 at the UAV may be a component of an unmanned aircraft system (UAS). The UAS may include one or more UAVs, a controller, and a system of communication (such as wireless network 100 or another system of communication) between the UAV and the controller.

The network node 110 may include one or more devices capable of transferring traffic, such as audio, video, text, and/or other traffic, destined for and/or received from the UE 120. The network node 110 may transmit traffic to and/or receive traffic from the UE 120 via an air interface. The network nodes 110 may include different types of base stations, such as a macro cell base station or a small cell base station (e.g., a micro cell base station, a pico cell base station, and/or a femto cell base station). A macro cell base station can cover a relatively large geographic area (e.g., several kilometers in radius). A small cell base station can be a lower-powered base station, as compared with a macro cell base station, that can operate in the same or different (e.g., licensed, unlicensed, etc.) frequency bands as macro cell base stations.

A ground control system may include one or more devices capable of managing the UAVs and/or flight plans for the UAVs. For example, a ground control system (GCS) may include a server device, a desktop computer, a laptop computer, or a similar device. In some aspects, the GCS may communicate with one or more devices of the environment (e.g., the UAV UE 120) to receive information regarding flight plans for the UAV and/or to provide recommendations associated with such flight plans. The GCS may permit a user to control the UAV. Additionally, or alternatively, the GCS may use a neural network and/or other AI to control the UAV UEs 120. In some aspects, the GCS may be included in a data center, a cloud computing environment, a server farm, and/or the like, which can include multiple GCS s.

A UAV service supplier (USS) device may include one or more devices capable of receiving, storing, processing, and/or providing information associated with the UAVs and/or the GCS. For example, the USS device may include a desktop computer, a laptop computer, a tablet computer, a mobile phone, or a similar device. In some aspects, the UE 120 at the UAV may interact with the USS device to register a flight plan, receive approval, analysis, and/or recommendation related to a flight plan, and/or the like. The USS device may register the UAV with the USS device by assigning an application-level UAV identifier to the UAV. The application-level UAV identifier may be an aviation administration (e.g., a regulatory body that governs aviation operation in a jurisdiction in which the USS device and the UAV are operating) UAV identifier.

The UAV UE 120 may be associated with an aerial subscription that is stored and maintained by the network, such as at a core network. The aerial subscription may be a subscription for aerial services provided by the network. The network may assign a network level UAV identifier to an aerial subscription (e.g., using an aviation-level mechanism to ensure global-uniqueness of the network level UAV identifier, such as by including a mobile country code (MCC) and/or a mobile network code (MNC) in the network level UAV identifier). In some aspects, the network level UAV identifier may be a general public subscription identifier (GPSI). The network level UAV identifier of an aerial subscription (e.g., that is associated with the UAV) may be communicated to the USS device that is associated with the UAV.

The UE 120 at the UAV may have beamforming architecture that supports beamforming for millimeter wave (mmW) communications, such as in wireless network 100. The architecture may have multiple components for beamforming, such as a modem (modulator/demodulator), a digital to analog converter (DAC), mixers, splitters, and/or combiners. The architecture may also include multiple amplifiers, multiple phase shifters, local oscillators, and an antenna array that includes multiple antenna elements. In some examples, the modem may be one or more of the modems 232 or modems 254 described in connection with FIG. 2.

The antenna array may include antenna elements and sub-elements for radiating or receiving radio frequency (RF) signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

The modem and/or a controller/processor may control one or more of the components to select one or more antenna elements and/or to form beams for transmission of one or more signals. For example, the antenna elements may be individually selected or deselected for transmission of a signal (or signals) by controlling an amplitude of one or more corresponding amplifiers. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array) can be dynamically controlled by modifying the phase shifts or phase offsets imparted by the phase shifters and amplitudes imparted by the amplifiers of the multiple signals relative to each other. The controller/processor may be located partially or fully within one or more other components of the architecture. For example, the controller/processor may be located within the modem, in some aspects.

Fast uplink antenna panel selection may be supported by the UE 120 at the UAV. However, there is no explicit panel identifier (ID) and no disclosure of an actual mapped physical panel and corresponding capability. The UE 120 may operate with beam correspondence or without beam correspondence. Without beam correspondence between the UE 120 and network nodes 110, an uplink beam or antenna panel of the UE 120 is selected by the network node 110 by configuring multiple sounding reference signal (SRS) resource sets for beam management with different transmit power control settings. The UE may reduce the transmit power due to a maximum permissible exposure (MPE) restriction, but the UE 120 does not inform the network node 110. With beam correspondence, the uplink beam/panel is selected by the network node 110 based on an enhanced Layer 1 (L1) beam report, because the best downlink beam may not be the best uplink beam, considering the MPE issue.

The UE 120 may report power management maximum power restriction (P-MPR) values associated with candidate uplink beams with an associated synchronization signal block (SSB) resource indicator (SSBRI) or a channel state information (CSI) resource indicator (CRI). The network node 110 may update the uplink beam by jointly considering corresponding P-MPR and L1-RSRP values. The UE 120 may transmit a port report to indicate a maximum SRS antenna port number of the SRS resource set for codebook (CB)-based physical uplink shared channel (PUSCH) for uplink beams with an associated SSBRI/CRI.

Examples 400, 402, and 404 show types of beams that may be formed by the UE 120 at the UAV. Example 400 shows an uplink beam that is omnidirectional. Example 402 shows a wide beam, and example 404 shows a narrow beam. An aerial UE with a line of sight (LOS) may generate significant uplink interference to terrestrial UEs and other UAVs near a receiving network node. Currently, a network node 110 may select a best uplink beam based on the RSRP at a serving cell (e.g., measured SRS power or downlink RSRP and uplink power report). However, the network node 110 (serving) may select an uplink beam of an aerial UE at a UAV with significant uplink interference to neighboring cells, because the network node 110 does not know the antenna configuration of the uplink beam. For example, the received signals in examples 400, 402, and 404 may be same, but the interference to neighboring cells in example 404 with a narrower uplink beam from the UAV is much less than the interference from the omnidirectional beam in example 400.

As indicated above, FIG. 4 is provided as an example. Other examples may differ from what is described with regard to FIG. 4.

Figure 5:
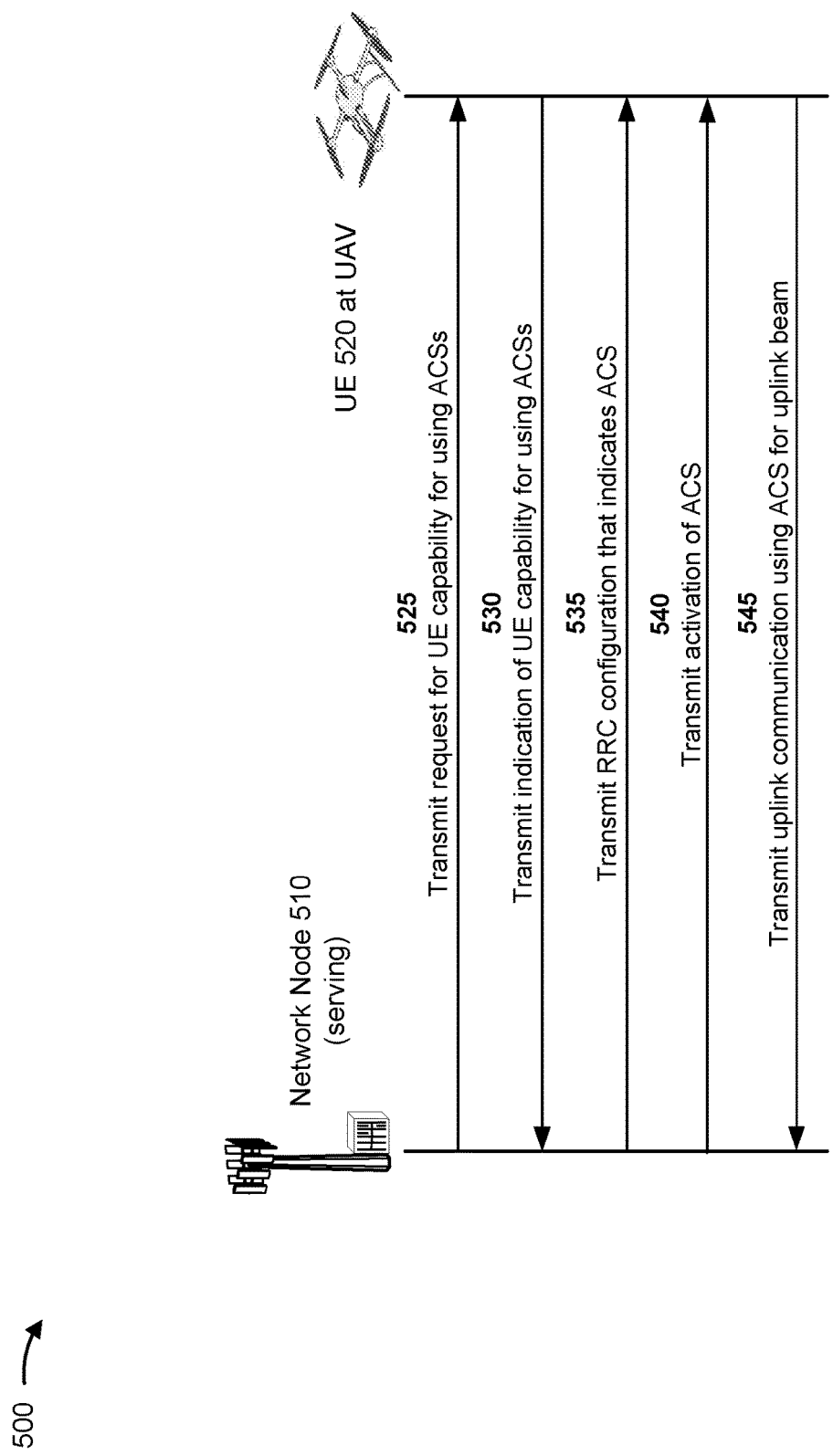
FIG. 5 is a diagram illustrating an example of indicating a capability for using antenna configuration sets (ACSs), in accordance with the present disclosure.

FIG. 5 is a diagram illustrating an example 500 of indicating a capability for using ACSs, in accordance with the present disclosure. As shown in FIG. 5, a network node 510 (e.g., network node 110) and a UE 520 (e.g., UE 520) may communicate with one another via a wireless network (e.g., wireless network 100). The UE 520 may be an aerial UE, such as at a UAV (e.g., a drone, a high-altitude platform station (HAPS)).

According to various aspects described herein, the UE 520 may transmit a UE capability of the UE 520 to use one or more ACSs for uplink beams. A UAV may be equipped with a directional antenna deployed in an FR1 band, where is not usually supported by UEs due to the large size. The directional antenna may be used to track the line-of-sight (LOS) direction between the aerial UE and the serving cell and reduce the interference to other cells. An ACS may include a beam configuration with a set of parameters that configures one or more antennas of an antenna array. The ACS may be identified by an ACS ID. The ACS may be specific to uplink beams from a UAV or other aerial viewpoint, which may be mobile or stationary. The ACS may be specific to a directional antenna. The ACS may configure antenna panels or elements to form a beam of a configured angular spread and transmit power. The ACS may be associated with an antenna class (e.g., omni, directional), quantity of antennas, quantity of beams, one or more antenna port IDs, a main lobe beam width (e.g., 90 degrees, 45 degrees), a main lobe gain (e.g., 3 decibels (dB), 6 dB), and/or a side lobe gain (e.g., 0 dB, 1.5 dB). The beam may be wide or narrow depending on a network layout, a position of the UAV, a position of the network node 510, and/or positions of neighboring network nodes and UEs. The ACS may be associated with a cell (e.g., serving cell identifier) and/or a reference signal transmitted from the cell.

In some aspects, the UE 520 may receive an indication of the ACS from the network node 510 to use for an uplink beam and transmit a communication using the uplink beam. Alternatively, or additionally, the UE 520 may select an ACS for the uplink beam and transmit assistance information that indicates the ACS used for the uplink beam. By coordinating an ACS for the uplink beam of the UE 520 from the UAV, the uplink beam from the UE 520 may be configured to mitigate interference caused by transmission from the UAV. As a result, communications may improve and improved communications conserve power, processing resources, and signaling resources.

Example 500 shows an example of the network node 510 indicating one or more ACSs for the UE 520 to use for an uplink beam. As shown by reference number 525, the network node 510 may optionally transmit a request for a UE capability of the UE 520 for using ACSs for uplink beams (e.g., UECapabilityEnquiry). As shown by reference number 530, the UE 520 may transmit an indication of the UE capability (e.g., UECapabilityInformation).

As shown by reference number 535, the network node 510 may transmit an RRC message, such as an RRC configuration, that indicates an ACS that the UE 520 is to use for the uplink beam. The RRC configuration may include information for an RRC connection, scheduling information, and/or beam configuration information such as the ACS. The network node 510 may provide details for the ACS or may indicate the ACS (e.g., via an index or transmit ACS ID) from among ACSs available to the UE 520. The RRC configuration may indicate up to M transmit ACSs. As shown by reference number 540, the network node 510 may transmit an activation of the MCS. The activation may activate multiple transmit ACSs that are predefined and/or subject to UE capability. The activation may be transmitted via a medium access control control element (MAC CE) as a more dynamic indication.

In some aspects, an ACS ID may be associated with one or more SRS resources. An SRS resource may include an ACS ID. The one or more SRS resources may be in one or more SRS resource sets used for CB or non-CB (NCB) operations or reporting. Up to 2 or 4 SRS resources in an SRS resource set with usage of CB or NCB may be configured for PUSCH by RRC. For PUSCH fast beam selection, the SRS resource indicator (SRI) in an uplink grant is used to select the SRS resource associated with the ACS ID.

The one or more SRS resources may be in SRS resource sets used for beam management. The SRS resources associated with the ACS ID in the SRS resource set for beam management may be used as the reference signal for uplink beam selection. The uplink beam selection may include physical uplink control channel (PUCCH) beam selection based at least in part on PUCCH spatial relation information (e.g., on PUCCH-SpatialRelationInfo). The uplink beam selection may include SRS beam selection based at least in part on SRS spatial relation information (e.g., SRS-SpatialRelationInfo). The uplink beam selection may be based at least in part on PUSCH, SRS, or PUCCH beam selection that is based at least in part on an uplink transmission configuration indicator (TCI) state selected by downlink control information (DCI).

In some aspects, an ACS may be associated with one or more SRS resource sets of SRS resources. An SRS resource set may include an ACS ID. The one or more SRS resource sets may be associated with usage of CB or NCB. Currently, up to 2 SRS resource sets with usage of CB/NCB may be configured for PUSCH by RRC. For PUSCH fast beam selection, the SRS resource set indicator in an uplink grant may be used to select the SRS resource set associated with the ACS ID. If M>2 ACSs can be configured, the network node 510 may allow up to N=2 ACSs to be activated by MAC CE such that only 2 SRS resource sets with an active ACS ID can be used for PUSCH.

The one or more SRS resource sets may be associated with beam management. Currently, up to 16 SRS resource sets with usage of beam management may be configured by RRC. All of the SRS resources in the same SRS resource set may share the same ACS ID and can be used as the reference signal for PUCCH beam selection, SRS beam selection, and/or PUSCH/SRS/PUCCH beam selection based at least in part on an uplink TCI state.

In some aspects, an ACS may be associated with one or more joint or uplink TCI states. The joint TCI state may be a unified TCI state that is used for multiple beam directions. The joint TCI state or the uplink TCI state may include an ACS ID. Currently, up to 8 joint or uplink TCI states may be activated by a MAC CE. For PUSCH/SRS/PUCCH beam selection, joint or uplink TCI states associated with the ACS ID may be selected by DCI.

In some aspects, an ACS may be associated with CSI reporting with a candidate uplink beam that is associated with an SSBRI or a CRI. The UE 520 may report the CSI (e.g., L1-RSRP, L1-SINR) associated with an ACS corresponding to an uplink beam associated with an SSBRI or CRI. The network node 510 may configure a list of UE ACS resources in an information element (IE), such as UetxACS-Resources in PUSCH-Config IE to request reporting CSI per transmit ACS associated with an SSBRI or CRI. A threshold of X dB for a neighbor cell may be configured such that the cell's RSRP measurement is no greater than the threshold.

As shown by reference number 545, the UE 520 may transmit one or more communications using the ACS for the uplink beam. In some aspects, the UE 520 may use only the TCI states, SRSs, and/or SRS resource sets, for the uplink beam, that are associated with ACSs that are activated.

As indicated above, FIG. 5 is provided as an example. Other examples may differ from what is described with respect to FIG. 5.

Figure 6:
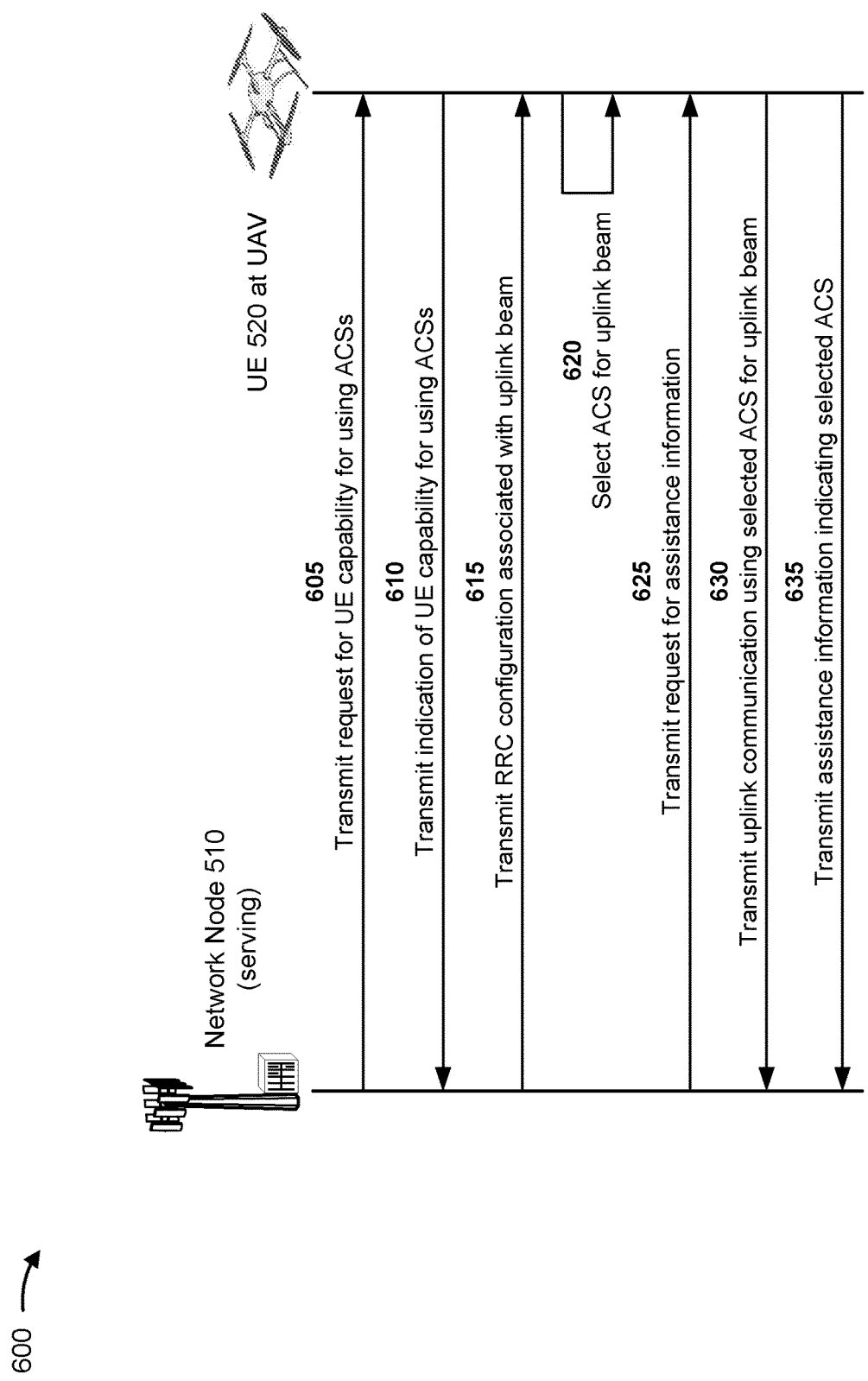
FIG. 6 is a diagram illustrating an example of indicating a capability for using ACSs, in accordance with the present disclosure.

FIG. 6 is a diagram illustrating an example 600 of indicating a capability for using ACSs, in accordance with the present disclosure.

Example 600 shows an example of an ACS selection by the UE 520 and the UE 520 informing the network node 510 of the ACS selection. As shown by reference number 605, the network node 510 may optionally transmit a request for a UE capability of the UE 520 for using ACSs for uplink beams. As shown by reference number 610, the UE 520 may transmit an indication of the UE capability.

As shown by reference number 615, the network node 510 may transmit an RRC message, such as an RRC configuration, associated with an uplink beam. However, the RRC configuration in example 600 does not indicate the ACS that the UE 520 is to use. The RRC configuration may provide other information for transmission in an uplink beam or may be associated with future uplink beam transmissions. The RRC configuration may request that the UE 520 select and use an ACS for the uplink beam. The network node 510 may indicate multiple ACSs that the UE 520 is able to use. As shown by reference number 620, the UE 520 may select an ACS for the uplink beam.

As shown by reference number 625, the network node 510 may optionally transmit a request for assistance information with any ACS selection by the UE 520 (e.g., UEAntennaAssistanceInfo or included in general UEAssistanceInfo). The request may be included in the first RRC configuration or transmitted in another RRC message or configuration. The UE 520 may transmit the assistance information one time (one shot) following a request. In some aspects, the UE 520 may transmit the assistance information periodically.

In some aspects, the assistance information may include a list of ACSs (e.g., ue-TxACS-AssociationList). The list may be configured by RRC to indicate an association between uplink beams and ACS IDs. An ACS ID may be associated with SRS resources or SRS resource sets. An ACS ID may be associated with joint or uplink TCI states. An ACS ID may be associated with an SSBRI or a CRI, where the SSB or CSI reference signal (CSI-RS) is configured as a downlink reference for measurement.

As shown by reference number 630, the UE 520 may transmit one or more communications using the selected ACS for the uplink beam. As shown by reference number 635, the UE 520 may transmit assistance information indicating the selected ACS. The assistance information may be transmitted before the communication, with the uplink communication, or after the communication.

As indicated above, FIG. 6 is provided as an example. Other examples may differ from what is described with respect to FIG. 6.

Figure 7:
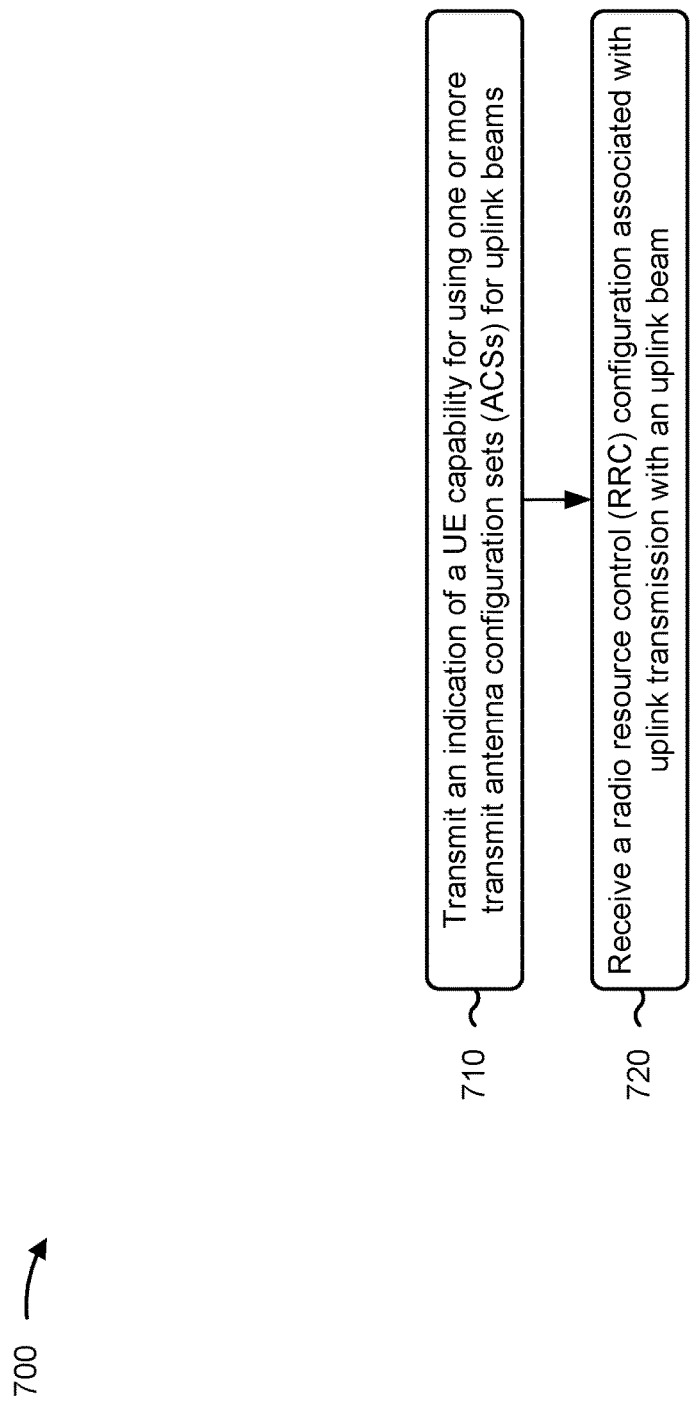
FIG. 7 is a diagram illustrating an example process performed, for example, by an aerial UE, such as a UE at an unmanned aerial vehicle, in accordance with the present disclosure.

FIG. 7 is a diagram illustrating an example process 700 performed, in some aspects, by an aerial UE, such as a UE at a UAV, in accordance with the present disclosure. Example process 700 is an example where the UE (e.g., UE 120, UE 520) performs operations associated with indicating a UE capability for using ACSs for an uplink beam.

As shown in FIG. 7, in some aspects, process 700 may include transmitting an indication of a UE capability for using one or more transmit ACSs for uplink beams (block 710). In some aspects, the UE (e.g., using communication manager 908 and/or transmission component 904 depicted in FIG. 9) may transmit an indication of a UE capability for using one or more transmit ACSs for uplink beams, as described above.

As further shown in FIG. 7, in some aspects, process 700 may include receiving an RRC configuration associated with uplink transmission with an uplink beam (block 720). In some aspects, the UE (e.g., using communication manager 908 and/or reception component 902 depicted in FIG. 9) may receive an RRC configuration associated with uplink transmission with an uplink beam, as described above.

Process 700 may include additional aspects, such as any single aspect or any combination of aspects described below and/or in connection with one or more other processes described elsewhere herein.

In a first aspect, the UE is at a UAV.

In a second aspect, alone or in combination with the first aspect, the RRC configuration indicates an ACS for the uplink beam.

In a third aspect, alone or in combination with one or more of the first and second aspects, process 700 includes selecting an ACS for the uplink beam, and transmitting assistance information indicating the ACS, the ACS associated with one or more uplink beams.

In a fourth aspect, alone or in combination with one or more of the first through third aspects, process 700 includes receiving a request to provide the assistance information before transmitting the assistance information.

In a fifth aspect, alone or in combination with one or more of the first through fourth aspects, transmitting the assistance information includes transmitting the assistance information once for the request.

In a sixth aspect, alone or in combination with one or more of the first through fifth aspects, transmitting the assistance information includes transmitting the assistance information periodically.

In a seventh aspect, alone or in combination with one or more of the first through sixth aspects, process 700 includes receiving a request to provide the indication of the UE capability.

In an eighth aspect, alone or in combination with one or more of the first through seventh aspects, process 700 includes receiving a MAC CE that activates one or more ACSs for one or more uplink beams.

In a ninth aspect, alone or in combination with one or more of the first through eighth aspects, process 700 includes transmitting an uplink communication using an ACS for the uplink beam, where the ACS is associated with one or more SRS resources in an SRS resource set.

In a tenth aspect, alone or in combination with one or more of the first through ninth aspects, the SRS resource set is associated with a codebook or beam management.

In an eleventh aspect, alone or in combination with one or more of the first through tenth aspects, process 700 includes transmitting an uplink communication using an ACS for the uplink beam, where the ACS is associated with one or more SRS resource sets.

In a twelfth aspect, alone or in combination with one or more of the first through eleventh aspects, process 700 includes transmitting an uplink communication using an ACS for the uplink beam, where the ACS is associated with one or more joint or uplink TCI states.

In a thirteenth aspect, alone or in combination with one or more of the first through twelfth aspects, process 700 includes transmitting an uplink communication using an ACS for the uplink beam, where the ACS is associated with CSI reporting, and the uplink beam is associated with an SSBRI or CRI.

In a fourteenth aspect, alone or in combination with one or more of the first through thirteenth aspects, the ACS is associated with a cell.

In a fifteenth aspect, alone or in combination with one or more of the first through fourteenth aspects, the ACS is associated with a reference signal transmitted from the cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
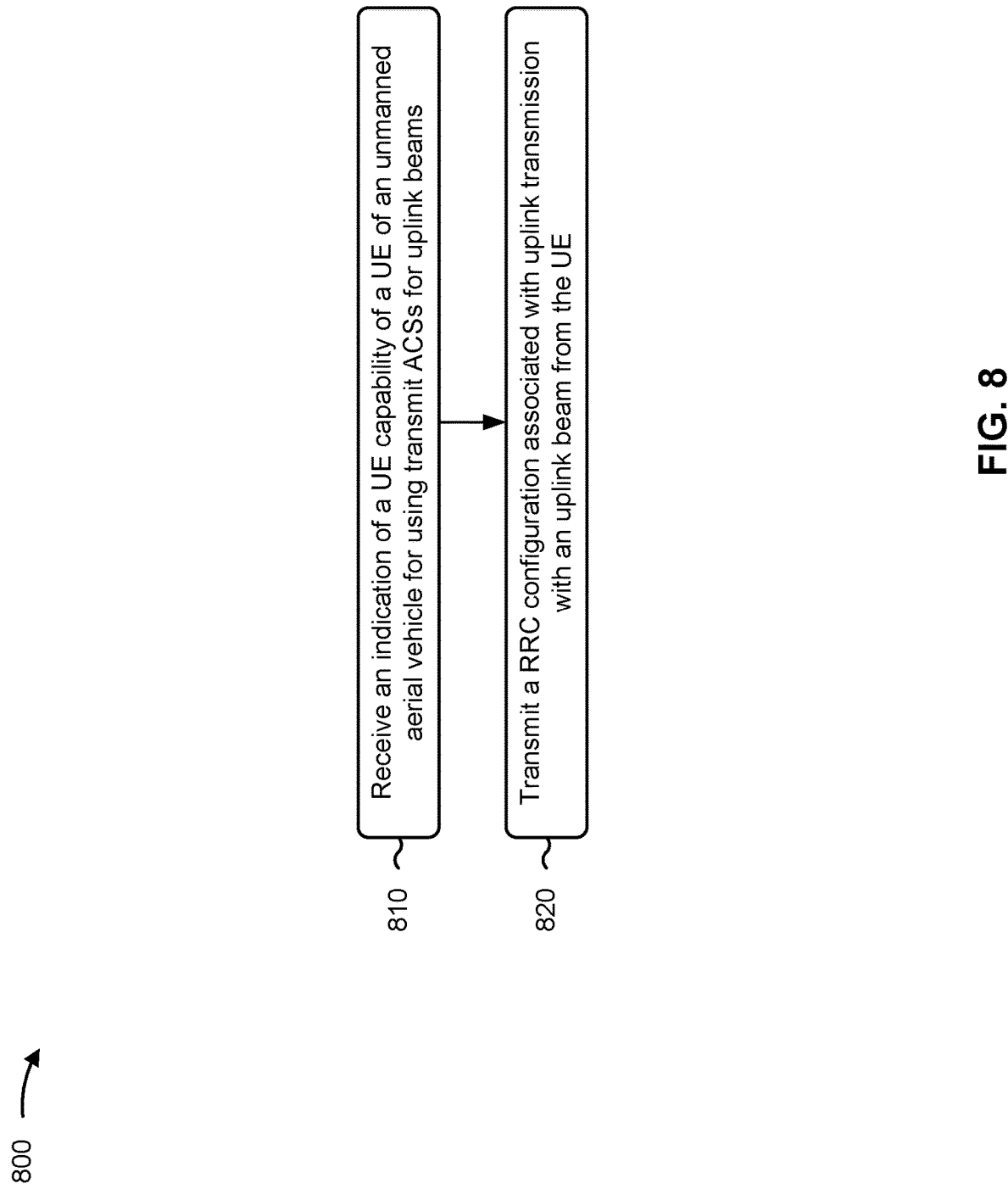
FIG. 8 is a diagram illustrating an example process performed, for example, by a network node, in accordance with the present disclosure.

FIG. 8 is a diagram illustrating an example process 800 performed, in some aspects, by a network node, in accordance with the present disclosure. Example process 800 is an example where the network node (e.g., network node 110, network node 510) performs operations associated with using an ACS for an uplink beam that is based at least in part on a UE capability for using ACSs for uplink beams.

As shown in FIG. 8, in some aspects, process 800 may include receiving an indication of a UE capability of an aerial UE (e.g., at a UAV) for using transmit ACSs for uplink beams (block 810). In some aspects, the network node (e.g., using communication manager 1008 and/or reception component 1002 depicted in FIG. 10) may receive an indication of a UE capability of a UE of an aerial UE for using transmit ACSs for uplink beams, as described above.

As further shown in FIG. 8, in some aspects, process 800 may include transmitting an RRC configuration associated with uplink transmission with an uplink beam from the UE (block 820). In some aspects, the network node (e.g., using communication manager 1008 and/or transmission component 1004 depicted in FIG. 10) may transmit an RRC configuration associated with uplink transmission with an uplink beam from the UE, as described above.

Process 800 may include additional aspects, such as any single aspect or any combination of aspects described below and/or in connection with one or more other processes described elsewhere herein.

In a first aspect, process 800 includes selecting the uplink beam and an ACS for the uplink beam based at least in part on the UE capability, where the RRC configuration indicates the ACS for the uplink beam.

In a second aspect, alone or in combination with the first aspect, process 800 includes receiving assistance information indicating an ACS for the uplink beam.

In a third aspect, alone or in combination with one or more of the first and second aspects, process 800 includes transmitting a request to provide the assistance information before receiving the assistance information.

In a fourth aspect, alone or in combination with one or more of the first through third aspects, the ACS is associated with one or more SRS resources in an SRS resource set.

In a fifth aspect, alone or in combination with one or more of the first through fourth aspects, the SRS resource set is associated with a codebook or beam management.

In a sixth aspect, alone or in combination with one or more of the first through fifth aspects, the ACS is associated with one or more SRS resource sets.

In a seventh aspect, alone or in combination with one or more of the first through sixth aspects, the ACS is associated with one or more joint or uplink TCI states.

In an eighth aspect, alone or in combination with one or more of the first through seventh aspects, the ACS is associated with CSI reporting, and the uplink beam is associated with an SSBRI or a CRI.

In a ninth aspect, alone or in combination with one or more of the first through eighth aspects, the ACS is associated with one or more of a cell or a reference signal transmitted from the cell.

In a tenth aspect, alone or in combination with one or more of the first through ninth aspects, process 800 includes transmitting a request to provide the indication of the UE capability.

In an eleventh aspect, alone or in combination with one or more of the first through tenth aspects, process 800 includes transmitting a MAC CE that activates one or more ACSs for one or more uplink beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
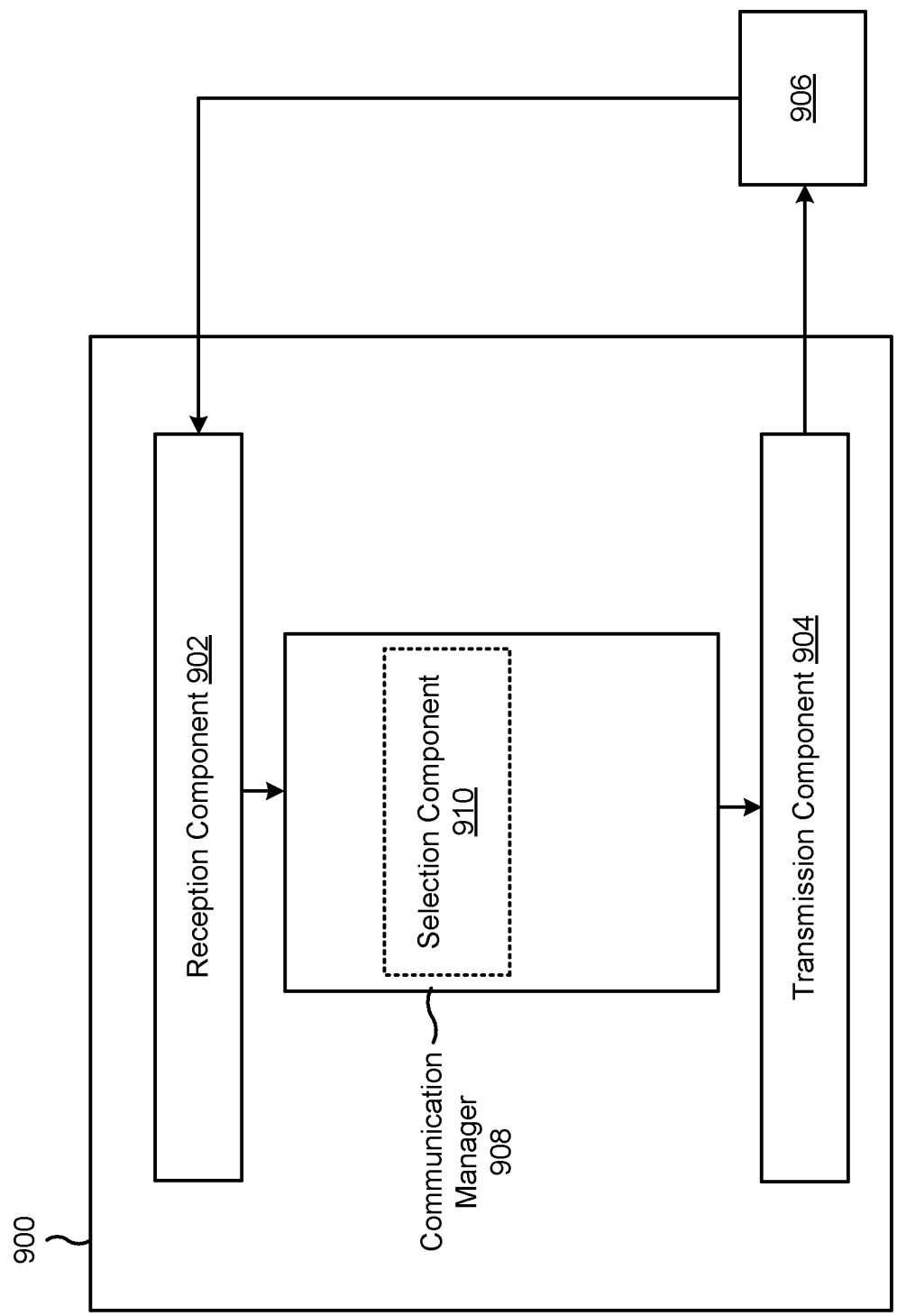
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be an aerial UE (e.g., UE 120, UE 520) at a UAV, or an aerial UE may include the apparatus 900. The UE may be configured to operate with or on a UAV. Such a configuration may include a design for attachment on or within the UAV. The configuration may include configuration settings for high-speed and/or high-altitude mobility, including for use of a direction antenna on the UAV. The configuration may include settings for operating with a USS or a ground control system.

In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the UE described in connection with FIG. 2. The communication manager 908 may be, or be similar to, the communication manager 140 depicted in FIGS. 1 and 2. For example, in some aspects, the communication manager 908 may be configured to perform one or more of the functions described as being performed by the communication manager 140. In some aspects, the communication manager 908 may include the reception component 902 and/or the transmission component 904. The communication manager 908 may include one or more of a selection component 910, among other examples.

In some aspects, the apparatus 900 may be configured to perform one or more operations described herein in connection with FIG. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit an indication of a UE capability for using one or more transmit ACSs for uplink beams. The reception component 902 may receive an RRC configuration associated with uplink transmission with an uplink beam.

The selection component 910 may select an ACS for the uplink beam. The transmission component 904 may transmit assistance information indicating the ACS, the ACS associated with one or more uplink beams. The reception component 902 may receive a request to provide the assistance information before transmitting the assistance information.

The reception component 902 may receive a request to provide the indication of the UE capability. The reception component 902 may receive a MAC CE that activates one or more ACSs for one or more uplink beams.

The transmission component 904 may transmit an uplink communication using an ACS for the uplink beam, where the ACS is associated with one or more sounding reference signal (SRS) resources in an SRS resource set. The transmission component 904 may transmit an uplink communication using an ACS for the uplink beam, where the ACS is associated with one or more SRS resource sets. The transmission component 904 may transmit an uplink communication using an ACS for the uplink beam, where the ACS is associated with one or more joint or uplink transmission configuration indicator states. The transmission component 904 may transmit an uplink communication using an ACS for the uplink beam, where the ACS is associated with channel state information (CSI) reporting, and the uplink beam is associated with a synchronization signal block resource indicator or a CSI resource indicator.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
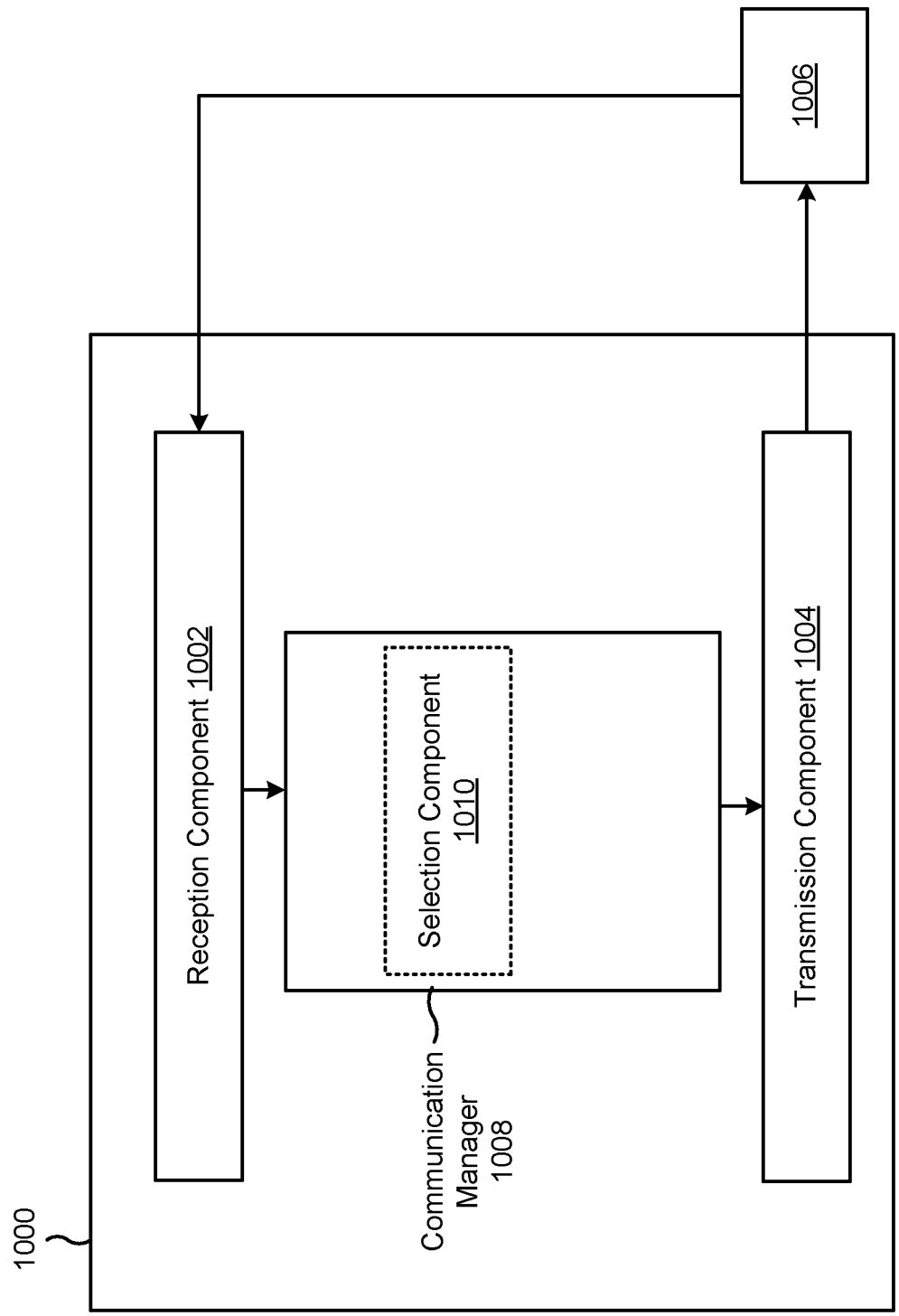
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node (e.g., network node 110, network node 510), or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the network entity described in connection with FIG. 2. The communication manager 1008 may be, or be similar to, the communication manager 150 depicted in FIGS. 1 and 2. For example, in some aspects, the communication manager 1008 may be configured to perform one or more of the functions described as being performed by the communication manager 150. In some aspects, the communication manager 1008 may include the reception component 1002 and/or the transmission component 1004. The communication manager 1008 may include one or more of a selection component 1010, among other examples.

In some aspects, the apparatus 1000 may be configured to perform one or more operations described herein in connection with FIG. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive an indication of a UE capability of a UE of an unmanned aerial vehicle for using transmit ACSs for uplink beams. The transmission component 1004 may transmit an RRC configuration associated with uplink transmission with an uplink beam from the UE.

The selection component 1010 may select the uplink beam and an ACS for the uplink beam based at least in part on the UE capability, where the RRC configuration indicates the ACS for the uplink beam.

The reception component 1002 may receive assistance information indicating an ACS for the uplink beam. The transmission component 1004 may transmit a request to provide the assistance information before receiving the assistance information.

The transmission component 1004 may transmit a request to provide the indication of the UE capability. The transmission component 1004 may transmit a MAC CE that activates one or more ACSs for one or more uplink beams.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting an indication of a UE capability for using one or more transmit antenna configuration sets (ACSs) for uplink beams; and receiving a radio resource control (RRC) configuration associated with uplink transmission with an uplink beam.

Aspect 2: The method of Aspect 1, wherein the UE is at an unmanned aerial vehicle.

Aspect 3: The method of Aspect 1 or 2, wherein the RRC configuration indicates an ACS for the uplink beam.

Aspect 4: The method of any of Aspects 1-3, further comprising: selecting an ACS for the uplink beam; and transmitting assistance information indicating the ACS, the ACS associated with one or more uplink beams.

Aspect 5: The method of Aspect 4, further comprising receiving a request to provide the assistance information before transmitting the assistance information.

Aspect 6: The method of Aspect 5, wherein transmitting the assistance information includes transmitting the assistance information once for the request.

Aspect 7: The method of Aspect 5 or 6, wherein transmitting the assistance information includes transmitting the assistance information periodically.

Aspect 8: The method of any of Aspects 1-7, further comprising receiving a request to provide the indication of the UE capability.

Aspect 9: The method of any of Aspects 1-8, further comprising receiving a medium access control control element (MAC CE) that activates one or more ACSs for one or more uplink beams.

Aspect 10: The method of any of Aspects 1-9, further comprising transmitting an uplink communication using an ACS for the uplink beam, wherein the ACS is associated with one or more sounding reference signal (SRS) resources in an SRS resource set.

Aspect 11: The method of Aspect 9, wherein the SRS resource set is associated with a codebook or beam management.

Aspect 12: The method of any of Aspects 1-11, further comprising transmitting an uplink communication using an ACS for the uplink beam, wherein the ACS is associated with one or more sounding reference signal (SRS) resource sets.

Aspect 13: The method of any of Aspects 1-12, further comprising transmitting an uplink communication using an ACS for the uplink beam, wherein the ACS is associated with one or more joint or uplink transmission configuration indicator states.

Aspect 14: The method of any of Aspects 1-13, further comprising transmitting an uplink communication using an ACS for the uplink beam, wherein the ACS is associated with channel state information (CSI) reporting, and wherein the uplink beam is associated with a synchronization signal block resource indicator or a CSI resource indicator.

Aspect 15: The method of Aspect 14, wherein the ACS is associated with a cell.

Aspect 16: The method of Aspect 15, wherein the ACS is associated with a reference signal transmitted from the cell.

Aspect 17: A method of wireless communication performed by a network node, comprising: receiving an indication of a user equipment (UE) capability of a UE of an unmanned aerial vehicle for using transmit antenna configuration sets (ACSs) for uplink beams; and transmitting a radio resource control (RRC) configuration associated with uplink transmission with an uplink beam from the UE.

Aspect 18: The method of Aspect 17, further comprising selecting the uplink beam and an ACS for the uplink beam based at least in part on the UE capability, wherein the RRC configuration indicates the ACS for the uplink beam.

Aspect 19: The method of Aspect 17 or 18, further comprising receiving assistance information indicating an ACS for the uplink beam.

Aspect 20: The method of Aspect 19, further comprising transmitting a request to provide the assistance information before receiving the assistance information.

Aspect 21: The method of Aspect 19 or 20, wherein the ACS is associated with one or more sounding reference signal (SRS) resources in an SRS resource set.

Aspect 22: The method of Aspect 21, wherein the SRS resource set is associated with a codebook or beam management.

Aspect 23: The method of any of Aspects 17-22, wherein the ACS is associated with one or more sounding reference signal (SRS) resource sets.

Aspect 24: The method of any of Aspects 17-23, wherein the ACS is associated with one or more joint or uplink transmission configuration indicator states.

Aspect 25: The method of any of Aspects 17-24, wherein the ACS is associated with channel state information (CSI)

reporting, and the uplink beam is associated with a synchronization signal block resource indicator or a CSI resource indicator.

Aspect 26: The method of Aspect 25, wherein the ACS is associated with one or more of a cell or a reference signal transmitted from the cell.

Aspect 27: The method of any of Aspects 17-26, further comprising transmitting a request to provide the indication of the UE capability.

Aspect 28: The method of any of Aspects 17-27, further comprising transmitting a medium access control control element (MAC CE) that activates one or more ACSs for one or more uplink beams.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:
   one or more memories; and
   one or more processors coupled to the one or more memories, the one or more processors individually or collectively configured to cause the UE to:
      transmit an indication of a UE capability for using one or more transmit antenna configuration sets (ACSs) for uplink beams, wherein an ACS of the one or more ACSs includes a set of parameters that configure one or more antennas of an antenna array of the UE based on one or more of an antenna class, a main lobe beam width, a main lobe gain, or a side lobe gain; and
      receive a radio resource control (RRC) configuration associated with uplink transmission with an uplink beam based at least in part on the UE capability.

2. The apparatus of claim 1, wherein the apparatus is at an unmanned aerial vehicle (UAV) or configured to operate on a UAV.

3. The apparatus of claim 1, wherein the RRC configuration indicates an ACS for the uplink beam.

4. The apparatus of claim 1, wherein the one or more processors are individually or collectively configured to cause the UE to:
   select an ACS for the uplink beam; and
   transmit assistance information indicating the ACS, the ACS associated with one or more uplink beams.

5. The apparatus of claim 4, wherein the one or more processors are individually or collectively configured to cause the UE to receive a request to provide the assistance information before transmitting the assistance information.

6. The apparatus of claim 5, wherein the one or more processors, to transmit the assistance information, are individually or collectively configured to cause the UE to transmit the assistance information once for the request.

7. The apparatus of claim 5, wherein the one or more processors, to transmit the assistance information, are individually or collectively configured to cause the UE to transmit the assistance information periodically.

8. The apparatus of claim 1, wherein the one or more processors are individually or collectively configured to cause the UE to receive a request to provide the indication of the UE capability.

9. The apparatus of claim 1, wherein the one or more processors are individually or collectively configured to cause the UE to receive a medium access control control element (MAC CE) that activates one or more ACSs for one or more uplink beams.

10. The apparatus of claim 1, wherein the one or more processors are individually or collectively configured to cause the UE to transmit an uplink communication using an ACS for the uplink beam, wherein the ACS is associated with one or more sounding reference signal (SRS) resources in an SRS resource set.

11. The apparatus of claim 10, wherein the SRS resource set is associated with a codebook or beam management.

12. The apparatus of claim 1, wherein the one or more processors are individually or collectively configured to cause the UE to transmit an uplink communication using an ACS for the uplink beam, wherein the ACS is associated with one or more sounding reference signal (SRS) resource sets.

13. The apparatus of claim 1, wherein the one or more processors are individually or collectively configured to cause the UE to transmit an uplink communication using an ACS for the uplink beam, wherein the ACS is associated with one or more joint or uplink transmission configuration indicator states.

14. The apparatus of claim 1, wherein the one or more processors are individually or collectively configured to cause the UE to transmit an uplink communication using an ACS for the uplink beam, wherein the ACS is associated with channel state information (CSI) reporting, and wherein the uplink beam is associated with a synchronization signal block resource indicator or a CSI resource indicator.

15. The apparatus of claim 14, wherein the ACS is associated with a cell.

16. The apparatus of claim 15, wherein the ACS is associated with a reference signal transmitted from the cell.

17. An apparatus of a network node for wireless communication, comprising:
one or more memories; and
one or more processors coupled to the one or more memories, the one or more processors configured to cause the network node to:
receive an indication of a user equipment (UE) capability of a UE of an unmanned aerial vehicle for using transmit antenna configuration sets (ACSs) for uplink beams, wherein an ACS of the one or more ACSs includes a set of parameters that configure one or more antennas of an antenna array of the UE based on one or more of an antenna class, a main lobe beam width, a main lobe gain, or a side lobe gain; and
transmit a radio resource control (RRC) configuration associated with uplink transmission with an uplink beam from the UE based at least in part on the UE capability.

18. The apparatus of claim 17, wherein the one or more processors are individually or collectively configured to cause the network node to select the uplink beam and an ACS for the uplink beam based at least in part on the UE capability, wherein the RRC configuration indicates the ACS for the uplink beam.

19. The apparatus of claim 17, wherein the one or more processors are individually or collectively configured to cause the network node to receive assistance information indicating an ACS for the uplink beam.

20. The apparatus of claim 19, wherein the one or more processors are individually or collectively configured to cause the network node to transmit a request to provide the assistance information before receiving the assistance information.

21. The apparatus of claim 19, wherein the ACS is associated with one or more sounding reference signal (SRS) resources in an SRS resource set.

22. The apparatus of claim 21, wherein the SRS resource set is associated with a codebook or beam management.

23. The apparatus of claim 19, wherein the ACS is associated with one or more sounding reference signal (SRS) resource sets.

24. The apparatus of claim 19, wherein the ACS is associated with one or more joint or uplink transmission configuration indicator states.

25. The apparatus of claim 19, wherein the ACS is associated with channel state information (CSI) reporting, and the uplink beam is associated with a synchronization signal block resource indicator or a CSI resource indicator.

26. The apparatus of claim 25, wherein the ACS is associated with one or more of a cell or a reference signal transmitted from the cell.

27. The apparatus of claim 17,
wherein the one or more processors are individually or collectively configured to cause the network node to transmit a request to provide the indication of the UE capability.

28. The apparatus of claim 17, wherein the one or more processors are individually or collectively configured to cause the network node to transmit a medium access control control element (MAC CE) that activates one or more ACSs for one or more uplink beams.

29. A method of wireless communication performed by a user equipment (UE), comprising:
transmitting an indication of a UE capability for using one or more transmit antenna configuration sets (ACSs) for uplink beams, wherein an ACS of the one or more ACSs includes a set of parameters that configure one or more antennas of an antenna array of the UE based on one or more of an antenna class, a main lobe beam width, a main lobe gain, or a side lobe gain; and
receiving a radio resource control (RRC) configuration associated with uplink transmission with an uplink beam based at least in part on the UE capability.

30. A method of wireless communication performed by a network node, comprising:
receiving an indication of a user equipment (UE) capability of a UE of an unmanned aerial vehicle for using transmit antenna configuration sets (ACSs) for uplink beams, wherein an ACS of the one or more ACSs includes a set of parameters that configure one or more antennas of an antenna array of the UE based on one or more of an antenna class, a main lobe beam width, a main lobe gain, or a side lobe gain; and transmitting a radio resource control (RRC) configuration associated with uplink transmission with an uplink beam from the UE based at least in part on the UE capability.

* * * * *